(12) United States Patent
Lin et al.

(10) Patent No.: US 11,226,494 B2
(45) Date of Patent: Jan. 18, 2022

(54) WEARABLE DEVICE AND ELECTRICAL CONNECTOR WITH MAGNETIC ATTRACTION

(71) Applicant: C.C.P.CONTACT PROBES CO., LTD., New Taipei (TW)

(72) Inventors: Yen-Wei Lin, New Taipei (TW); Bor-Chen Tsai, New Taipei (TW)

(73) Assignee: C.C.P.CONTACT PROBES CO., LTD., New Taipei (TW)

( * ) Notice: Subject to any disclaimer, the term of this patent is extended or adjusted under 35 U.S.C. 154(b) by 253 days.

(21) Appl. No.: 16/689,209

(22) Filed: Nov. 20, 2019

(65) Prior Publication Data

US 2020/0271953 A1 Aug. 27, 2020

(30) Foreign Application Priority Data

Feb. 27, 2019 (TW) .................................. 108106891

(51) Int. Cl.
*G02C 5/22* (2006.01)
*G02B 27/01* (2006.01)
*G06K 19/077* (2006.01)

(52) U.S. Cl.
CPC ......... *G02C 5/2209* (2013.01); *G02B 27/017* (2013.01); *G02B 2027/0178* (2013.01); *G02C 2200/02* (2013.01); *G06K 19/07762* (2013.01)

(58) Field of Classification Search
CPC .......... G02B 2027/0178; G02B 27/017; G02B 27/0176; G02B 27/01; G06K 19/07762; G02C 5/2209; G02C 5/22; G02C 2200/02; G02C 2200/04

USPC .................................................. 351/140, 153
See application file for complete search history.

(56) References Cited

U.S. PATENT DOCUMENTS

| | | | | |
|---|---|---|---|---|
| 6,217,170 B1 * | 4/2001 | Hsiao | ....................... | G02C 5/22 16/228 |
| 7,422,323 B2 * | 9/2008 | Saitoh | ....................... | G02C 5/22 16/228 |
| 7,581,833 B2 * | 9/2009 | Howell | ................... | G02C 5/143 351/121 |
| 7,922,321 B2 * | 4/2011 | Howell | ................... | G02C 5/001 351/158 |
| 8,500,271 B2 * | 8/2013 | Howell | ................... | G02C 11/06 351/158 |

(Continued)

*Primary Examiner* — William R Alexander
(74) *Attorney, Agent, or Firm* — Li & Cai Intellectual Property (USA) Office

(57) ABSTRACT

A wearable device and an electrical connector with magnetic attraction are provided. The wearable device includes a first body and a second body. The first body has a first pivotal structure and two inner walls respectively provided with a first magnetic attraction member and a plurality of first terminal structures. The second body has a second pivotal structure, and is provided with a second magnetic attraction member and a plurality of second terminal structures. When the second pivotal structure is pivotally connected to the first pivotal structure, the second body is rotatable relative to the first body, and the first and second magnetic attraction members are moved by following the first and second bodies. When the first and second magnetic attraction members are magnetically attracted to each other so as to fix the first body and the second body, the first terminal structures contact the second terminal structures.

10 Claims, 14 Drawing Sheets

(56) References Cited

U.S. PATENT DOCUMENTS

| | | | | |
|---|---|---|---|---|
| 9,033,493 | B2* | 5/2015 | Howell | G02C 5/146 |
| | | | | 351/158 |
| 9,201,249 | B2* | 12/2015 | Santarelli | G02C 5/2209 |
| 9,724,562 | B2* | 8/2017 | Bailly | G06K 9/00342 |
| 9,726,900 | B1* | 8/2017 | Holzer | G02C 5/20 |
| 10,060,790 | B2* | 8/2018 | Howell | G01J 1/429 |
| 10,223,710 | B2* | 3/2019 | Purves | G06F 3/011 |
| 10,293,208 | B2* | 5/2019 | Bailly | G06K 9/00342 |
| 10,330,956 | B2* | 6/2019 | Howell | G02C 11/06 |
| 10,463,301 | B2* | 11/2019 | Liu | A61B 5/681 |
| 10,670,889 | B1* | 6/2020 | Hanover | H01R 13/6205 |
| 10,685,379 | B2* | 6/2020 | Purves | G06Q 20/321 |
| 11,061,252 | B2* | 7/2021 | Blum | H01R 35/04 |
| 11,074,488 | B2* | 7/2021 | Klimt | G06F 1/163 |
| 11,086,147 | B2* | 8/2021 | Howell | G02C 5/146 |
| 2005/0248719 | A1* | 11/2005 | Howell | G02C 11/10 |
| | | | | 351/41 |
| 2014/0104562 | A1* | 4/2014 | Kim | G02C 5/146 |
| | | | | 351/116 |
| 2014/0226120 | A1* | 8/2014 | Chen | G02C 5/146 |
| | | | | 351/116 |
| 2014/0337621 | A1* | 11/2014 | Nakhimov | H04W 12/068 |
| | | | | 713/168 |
| 2015/0253590 | A1* | 9/2015 | Howell | G02C 5/146 |
| | | | | 351/158 |
| 2016/0346609 | A1* | 12/2016 | Bailly | G06K 9/00342 |
| 2017/0146816 | A1* | 5/2017 | Chen | G02C 5/143 |
| 2017/0361162 | A1* | 12/2017 | Bailly | H04Q 9/00 |
| 2018/0279889 | A1* | 10/2018 | Lee | A61B 5/00 |
| 2019/0033622 | A1* | 1/2019 | Olgun | H01Q 7/00 |
| 2019/0033623 | A1* | 1/2019 | Howell | G02C 11/06 |
| 2019/0053584 | A1* | 2/2019 | Perkins | G04B 37/1486 |

* cited by examiner

WEARABLE DEVICE AND ELECTRICAL CONNECTOR WITH MAGNETIC ATTRACTION

CROSS-REFERENCE TO RELATED PATENT APPLICATION

This application claims the benefit of priority to Taiwan Patent Application No. 108106891, filed on Feb. 27, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a wearable device and an electrical connector with magnetic attraction, and more particularly to a wearable device and an electrical connector with magnetic attraction that connects two components of the wearable device.

BACKGROUND OF THE DISCLOSURE

A conventional wearable device (e.g., a pair of virtual reality glasses, a pair of augmented reality glasses, a pair of mixed reality glasses, or a head-mounted display device/a helmet-mounted display device) is usually provided with a battery, and the conventional wearable device is worn on a user's head, so that the weight of the conventional wearable device cannot be too heavy. When the user uses the conventional wearable device, the battery needs to be charged very often. However, a charging process of the conventional wearable device is almost implemented by connecting to an external wire, so that the user basically cannot use the conventional wearable device in the charging process. Accordingly, for related manufacturers, how users can quickly replace batteries has become one of the trends in the development of wearable devices.

SUMMARY OF THE DISCLOSURE

In response to the above-referenced technical inadequacies, the present disclosure provides a wearable device and an electrical connector with magnetic attraction to effectively improve the issues associated with conventional wearable devices (e.g., a battery in conventional wearable device being difficult to be replaced).

In one aspect, the present disclosure provides a wearable device, which includes a first body, at least one first magnetic attraction member, a plurality of first terminal structures, a first pivotal structure, a first electrical unit, a second body, at least one second magnetic attraction member, a plurality of second terminal structures, and a second electrical unit. The first body includes an engaging slot. Two inner walls of the engaging slot of the first body connected to each other are defined as two first functional walls. The at least one first magnetic attraction member is fixed on one of the two first functional walls. The first terminal structures are disposed in the other one of the two first functional walls and are spaced apart from each other. The first pivotal structure is arranged on the first body and is arranged adjacent to the engaging slot. The first electrical unit is connected to at least one of the first terminal structures. The second body has a second pivotal structure that is configured to be pivotally connected to the first pivotal structure. Two outer walls of the second body connected to each other are defined as two second functional walls. The at least one second magnetic attraction member is disposed on one of the two second functional walls. The second terminal structures are disposed in the other one of the two second functional walls and are spaced apart from each other. The second electrical unit is connected to at least one of the second terminal structures. When the first pivotal structure and the second pivotal structure are pivotally connected to each other, the second body is rotatable relative to the first body along a rotation axis. When the second body is at a fixing position by being rotated relative to the first body, the first magnetic attraction member and the second magnetic attraction member are fixed to each other by using a magnetic attraction there-between, so that the first body and the second body are fixed to each other, and the first terminal structures respectively contact the second terminal structures, and the first electrical unit connects with the second electrical unit.

In one aspect, the present disclosure provides an electrical connector with magnetic attraction for being applied to a wearable device that includes a first body, at least one first magnetic attraction member and a plurality of first terminal structures which are respectively disposed on two inner walls of the first body connected to each other, a first pivotal structure disposed on the first body, and a first electrical unit connected to at least one of the first terminals structures. The electrical connector includes a second body, at least one second magnetic attraction member, and a plurality of second terminal structures. The second body has a second pivotal structure that is configured to be pivotally connected to the first pivotal structure. Two outer walls of the second body connected to each other are defined as two second functional walls. The at least one second magnetic attraction member is disposed on one of the two second functional walls. The at least one second magnetic attraction member is configured to fix to the at least one first magnetic attraction member by using a magnetic attraction there-between. The second terminal structures are disposed in the other one of the two second functional walls and are spaced apart from each other. The second terminal structures are configured to contact the first terminal structures. When the second pivotal structure is pivotally connected to the first pivotal structure, the second body is rotatable relative to the first body along a rotation axis. When the second body is at a fixing position by being rotated relative to the first body, the second magnetic attraction member is fixed to the first magnetic attraction member by using the magnetic attraction there-between, so that the second body is fixed to the first body. When the second magnetic attraction member is fixed to the first magnetic attraction member by using the magnetic attraction there-between, the second terminal structures respectively contact the first terminal structures.

Therefore, in the wearable device or the electrical connector applied to a wearable device of the present disclosure, the second body can be conveniently detached from the first body by the cooperation of the first magnetic attraction member, the second magnetic attraction member, the first terminal structures, and the second terminal structures. In addition, the stability of connection between the first terminal structures and the second terminal structures can be maintained by the cooperation of the first magnetic attraction member and the second magnetic attraction member.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
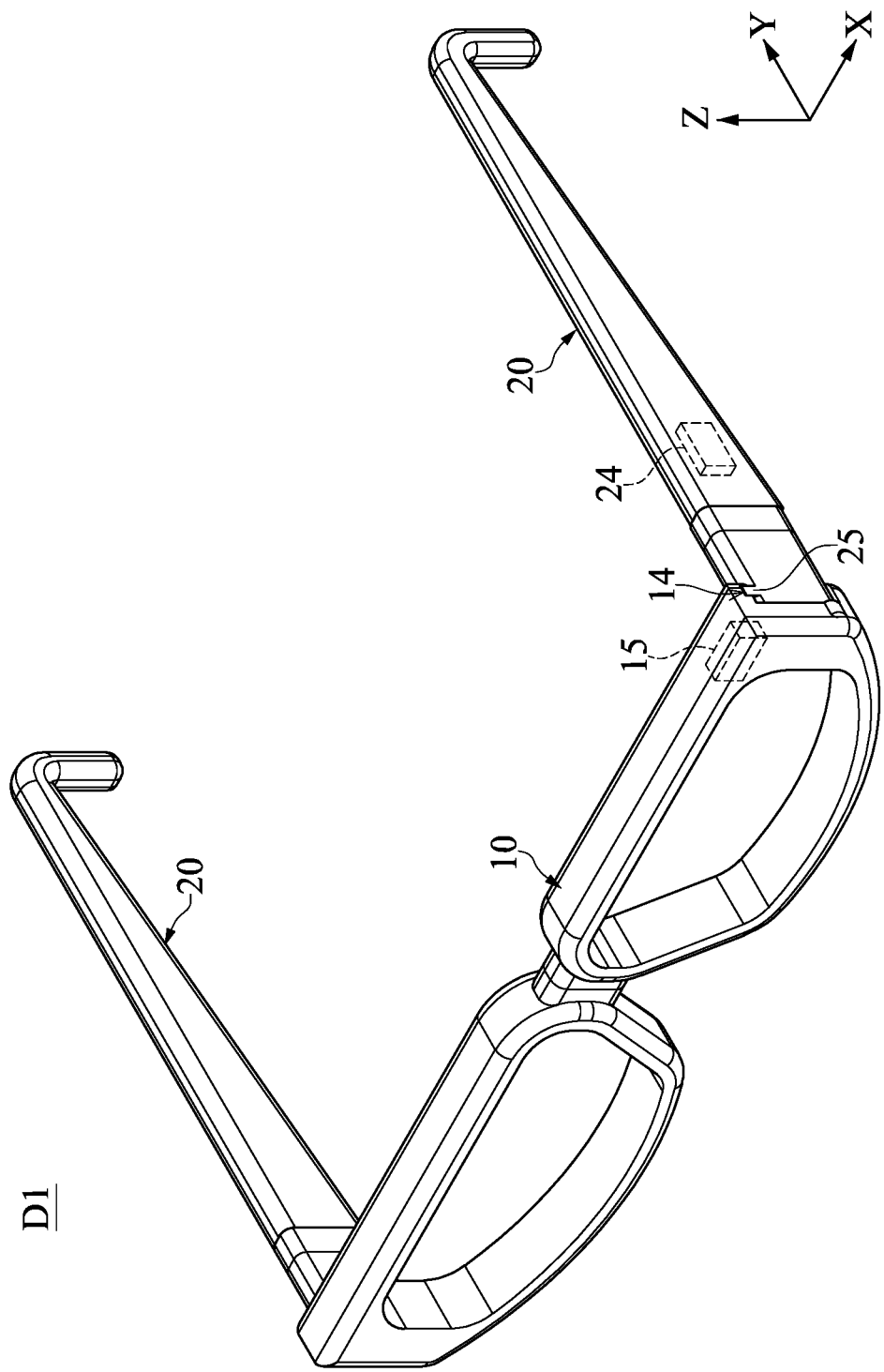
FIG. 1 is a perspective view of a wearable device that is a pair of glasses according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 7, an embodiment of the present disclosure provides a wearable device. The wearable device in the present embodiment is a pair of glasses, but the wearable device of the present disclosure is not limited thereto. For example, the wearable device can be other types of wearable devices.

Figure 2:
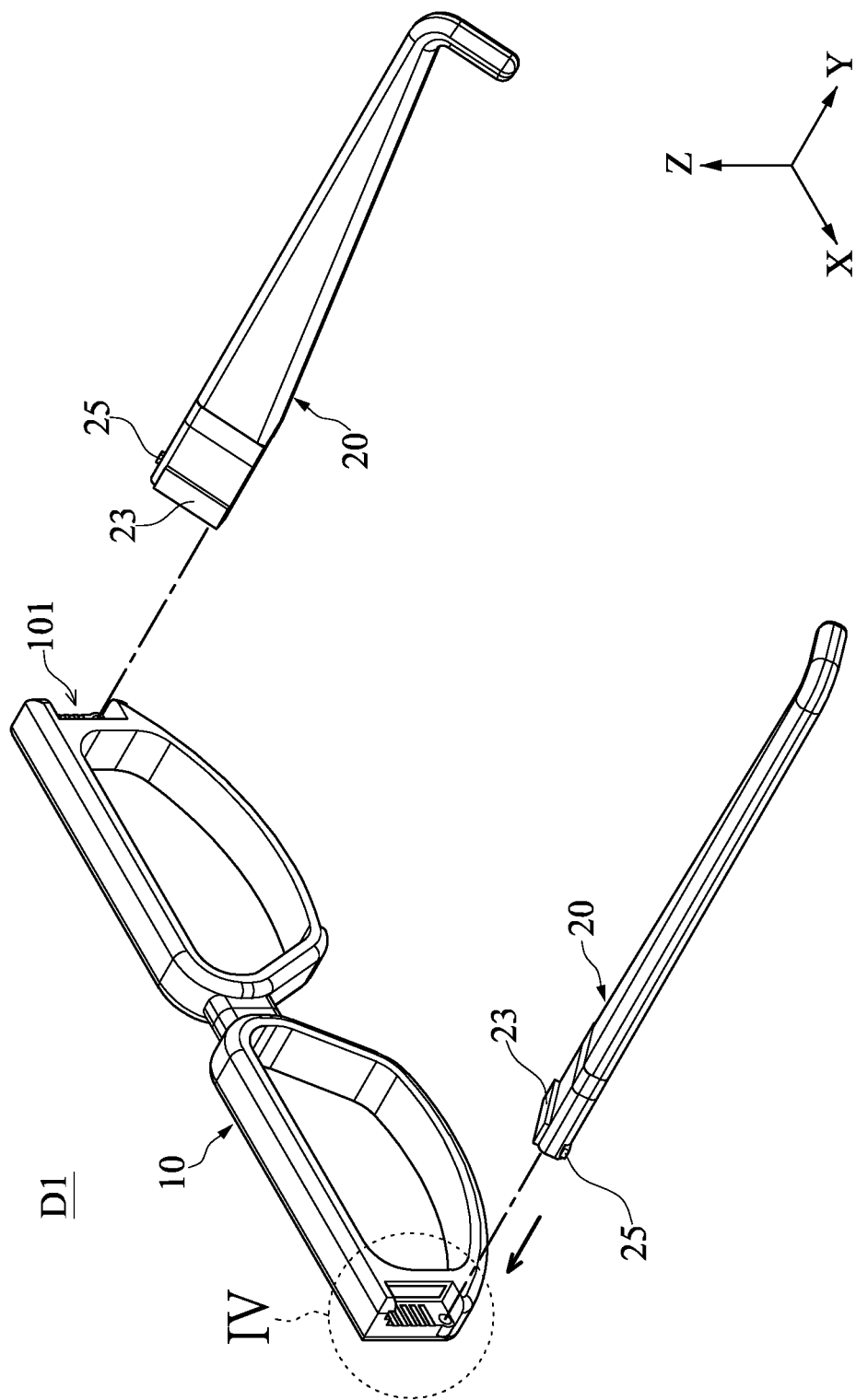
FIG. 2 and FIG. 3 are exploded views of FIG. 1 in different angles of view.
Figure 4:
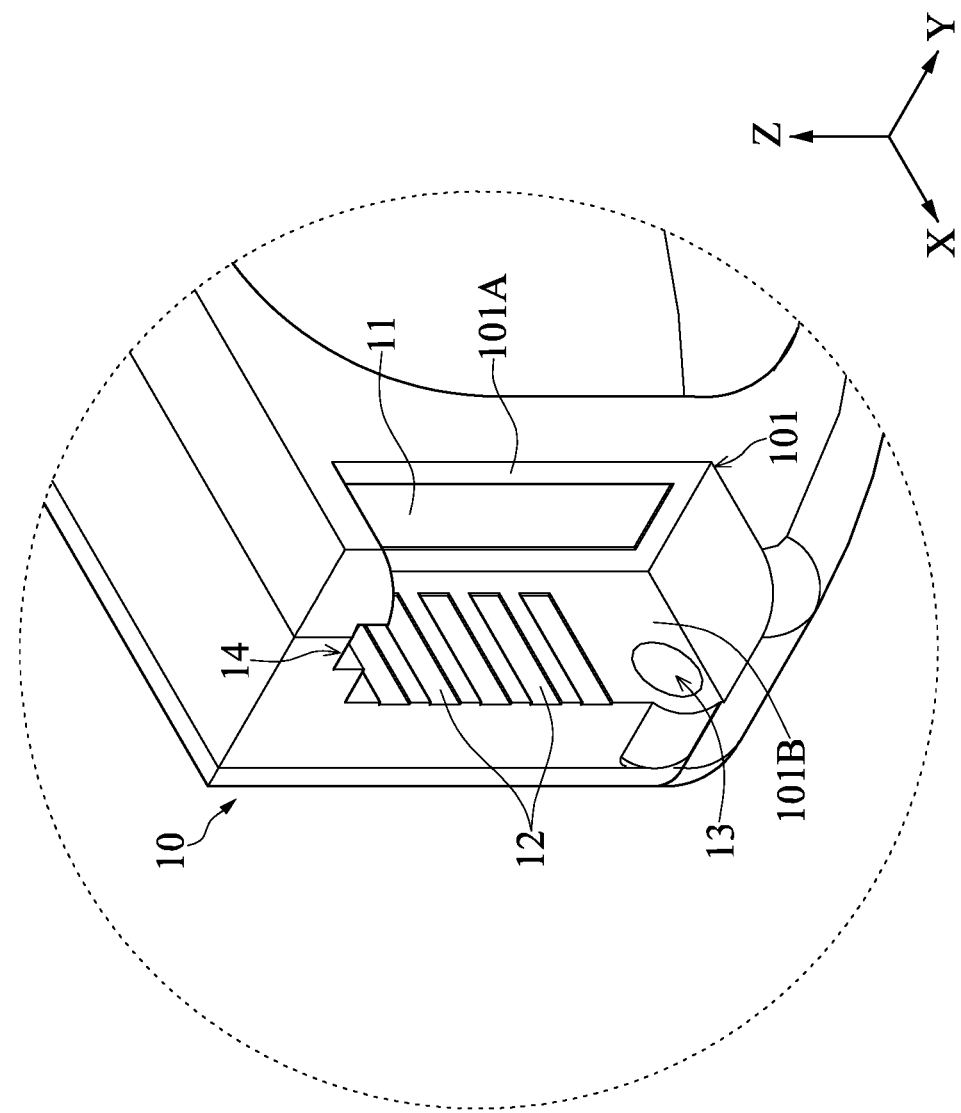
FIG. 4 is an enlarged view of portion IV of FIG. 2.

As shown in FIG. 2 and FIG. 4, the wearable device D1 includes a first body 10, two second bodies 20, and a plurality of components fastened to (or formed on) the first body 10 and the two second bodies 20. In the present embodiment, the first body 10 is a spectacle frame, and the two second bodies 20 are temples and are detachably connected to the first body 10. In practical application, the first body 10 and the two second bodies 20 are simply shown in the drawings, and can be changed according to design requirements. For example, the wearable device D1 of the present disclosure can be a pair of virtual reality glasses device, an augmented reality glasses device, a mixed reality glasses device, or a head-mounted display device, but is not limited thereto.

It should be noted that the wearable device D1 of the present embodiment is shown as the glasses having the two second bodies 20, but the present disclosure is not limited thereto. In other embodiments of the present disclosure, the wearable device D1 being a pair of glasses can include a single second body 20 and a conventional temple.

Two opposite end portions of the first body 10 each are provided with a first magnetic attraction member 11, a plurality of first terminal structures 12, a first pivotal structure 13, and a first retaining structure 14. The first body 10 is provided with a first electrical unit 15 embedded therein. Specifically, each of the two opposite end portions of the first body 10 has an engaging slot 101 inwardly recessed therein along a first direction (e.g., a Y axis shown in FIG. 2). Two inner walls of the engaging slot 101 of the first body 10 connected to each other are defined as two first functional walls 101A, 101B. The first magnetic attraction member 11 is disposed on the first functional wall 101A that forms a portion of engaging slot 101, and can be a magnet or a component that can be attracted by a magnet. The size or shape of the engaging slot 101 is formed according to the shape of the second body 20, and the drawings of the present embodiment only show one mode. In practical application, the number and shape of the first magnetic attraction member 11 can be changed according to design requirements, and are not limited to those shown in the drawings of the present embodiment.

The first terminal structures 12 are disposed in the first functional wall 101B that forms a portion of the engaging slot 101, and are spaced apart from each other. In practical application, the number and shape of each of the first terminal structures 12 can be changed according to design requirements, and is not limited to the present embodiment. Each of the first terminal structures 12 is capable of transmitting signal, transmitting electricity, or being grounded according to design requirements.

As shown in FIG. 4, the first pivotal structure 13 can be a shaft hole that is recessed in the first functional wall 101A along the first direction (e.g., the Y axis shown in FIG. 2). In addition, the shape and position of the first pivotal structure 13 is not limited to those shown in the drawings of the present embodiment. For example, any configuration with the first pivotal structure 13 being arranged adjacent to the engaging slot 101 should be within the scope of the present disclosure.

As shown in FIG. 1, the first body 10 can be provided with a plurality of first electrical units 15 according to the functions of the wearable device D1, and the first electrical units 15 can be fixed onto a circuit board. For example, the first electrical units 15 can include microprocessors, communication chips, and/or memory chips. At least one of the first electrical units 15 is connected to at least one of the first terminal structures 12, and the first electrical unit 15 can receive signal or electricity transmitted from the first terminal structure 12.

Figure 3:
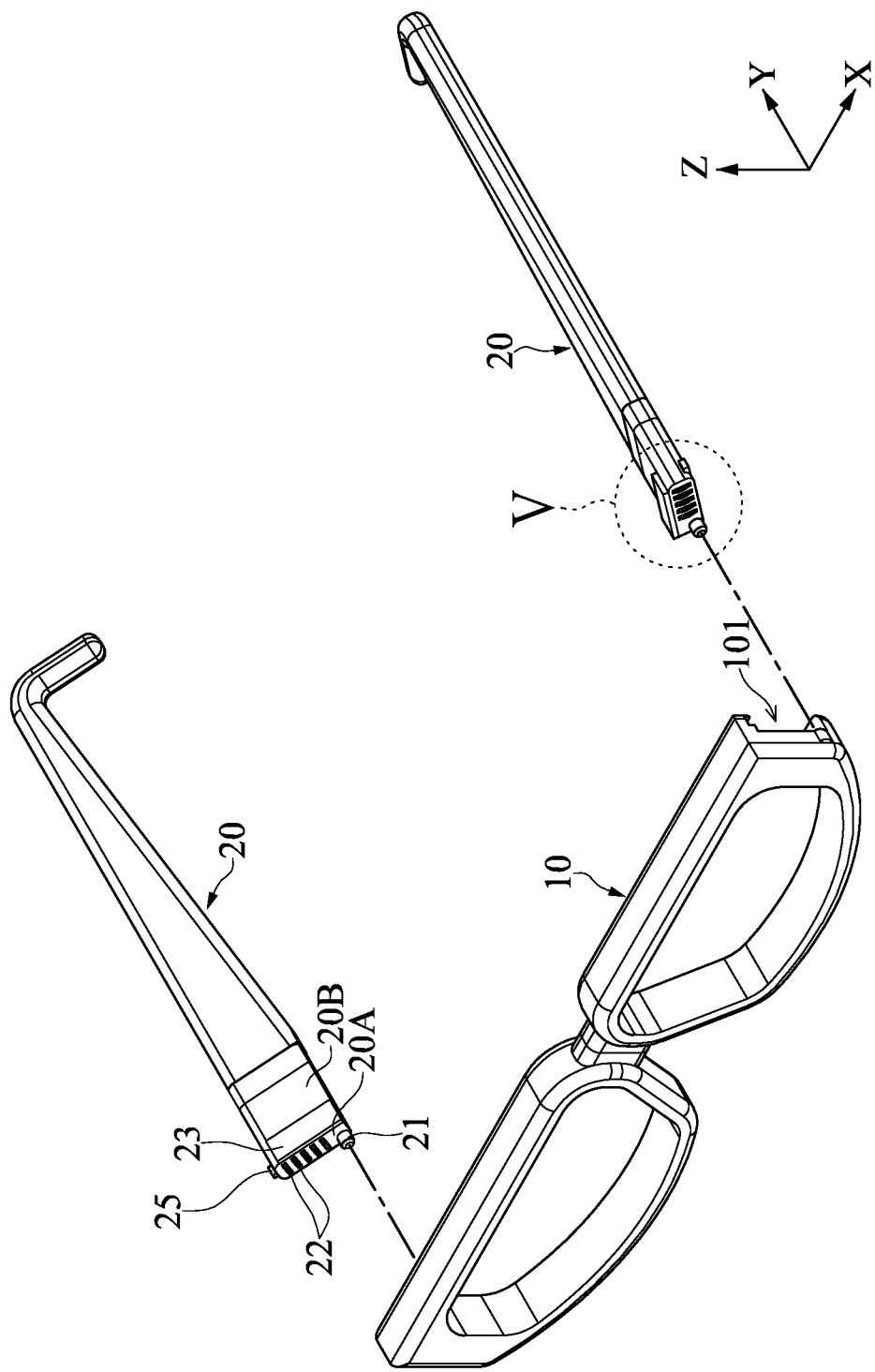
Figure 5:
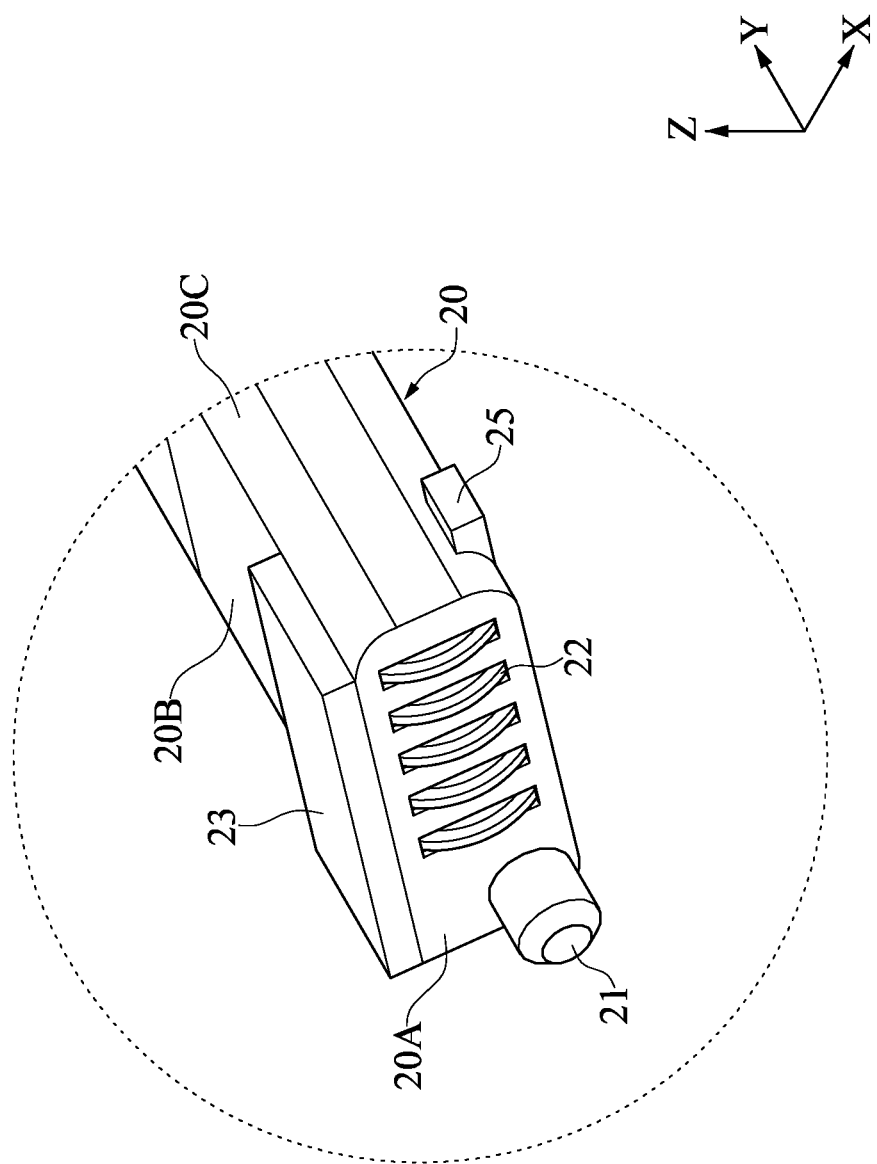
FIG. 5 is an enlarged view of portion V of FIG. 3.
Figure 6:
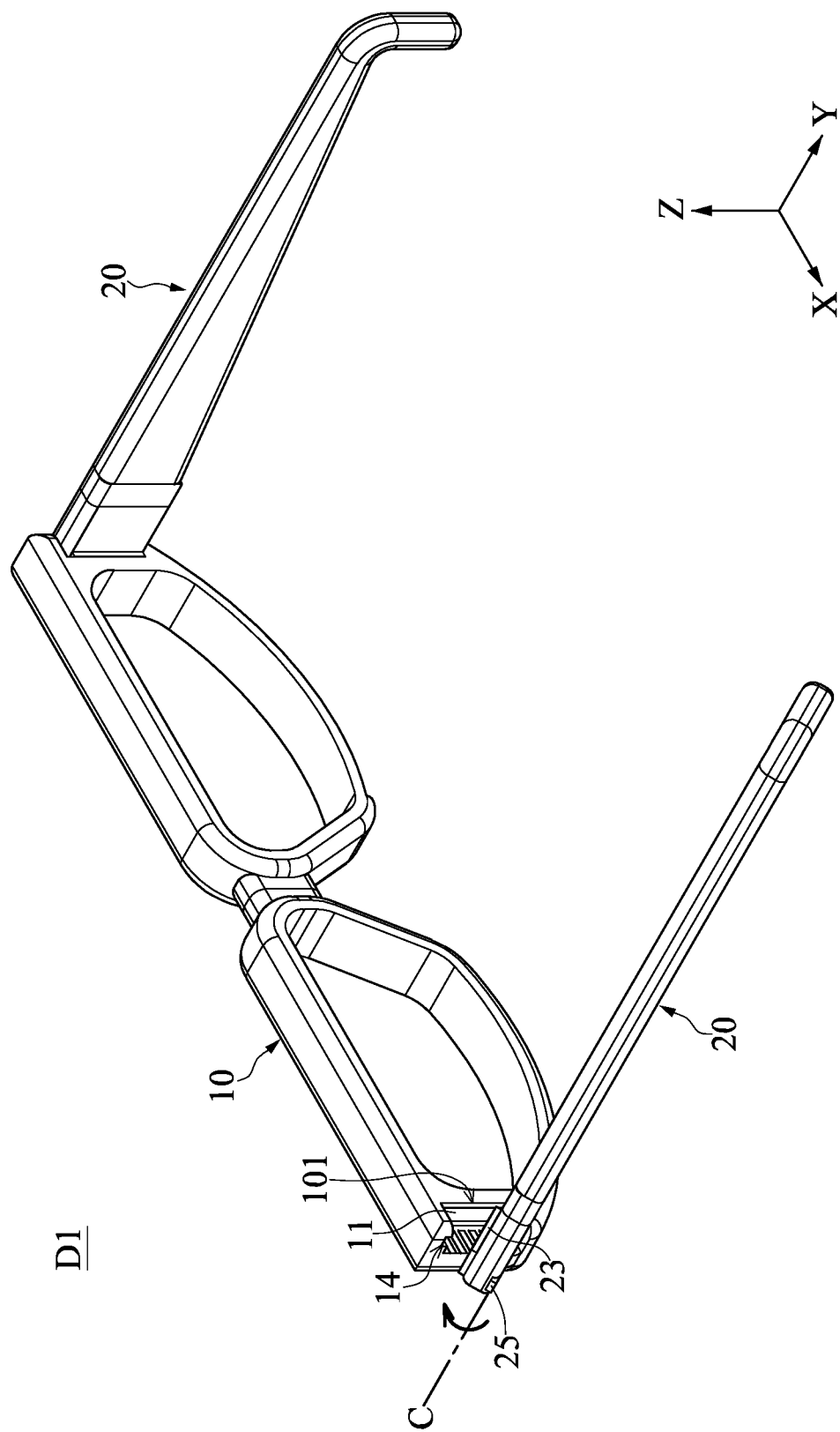
FIG. 6 is a perspective view showing an assembling process of wearable device of FIG. 1.

As shown in FIG. 1, FIG. 3, and FIG. 5, each of the two second bodies 20 is a temple. One end of the second body 20 is configured to hang on user's ear, and the other end of the second body 20 has two outer walls connected to each other and defined as two second functional walls 20A, 20B. A second pivotal structure 21 extends from the second functional wall 20A in a direction away from the second body 20, and can be pivotally connected to the first pivotal structure 13 (shown in FIG. 4). When the second pivotal structure 21 and the first pivotal structure 13 are pivotally connected to each other, the second body 20 is rotatable relative to the first body 10 along a rotation axis C. In the present embodiment, the first pivotal structure 13 is a shaft hole, and the second pivotal structure 21 is a column, but the present disclosure is not limited thereto.

The second functional wall 20A is further provided with a plurality of second terminal structures 22 spaced apart from each other. The second terminal structures 22 are configured to contact the first terminal structures 12. In other words, the number of the second terminal structures 22 corresponds to that of the first terminal structures 12.

The second functional wall 20B is provided with a second magnetic attraction member 23 that can be fixed to the first magnetic attraction member 11 by using a magnetic attraction there-between. For example, the second magnetic attraction member 23 can be a magnet or a component that can be attracted by a magnet. When the second magnetic attraction member 23 is fixed to the first magnetic attraction member 11 by using the magnetic attraction there-between, the first body 10 and the second body 20 are fixed. In other words, the first body 10 and the second body 20 can be fixed through the magnetic attraction between the first magnetic attraction member 11 and the second magnetic attraction member 23. Moreover, the first magnetic attraction member 11 and the second magnetic attraction member 23 can be two magnets having different polarities, or can be a magnet and a component that can be attracted by the magnet. In a specific application, each of the magnetic attraction member 11 and the second magnetic attraction member 23 can be formed with other members (e.g., plastic cases) on an outer surface thereof according to design requirements. In practical application, the number and shape of the second magnetic attraction member 23 can be changed according to design requirements, and are not limited to those shown in the drawings of the present embodiment.

As shown in FIG. 1, the second body 20 is provided with at least one second electrical unit 24 therein, and the at least one second electrical unit 24 is connected to at least one of the second terminal structures 22. The second electrical unit 24 can be batteries, microprocessors, memory chips, sensors, earphones, controllers, or vibration motors, but is not limited thereto. In the present embodiment, the second electrical unit 24 arranged in one of the two second bodies 20 is a battery, and the second electrical unit 24 arranged in the other one of the two second bodies 20 can be a memory chip. Accordingly, the user can quickly replace the battery or the memory chip of the wearable device D1 by replacing the original temple with a different temple (i.e., the different second bodies 20).

As shown in FIG. 1, FIG. 3, and FIG. 4, when the second terminal structures 22 contact the first terminal structures 12, the second electrical unit 24 in the second body 20 can be connected to (e.g., electrically connected to) the first electrical unit 15 in the first body 10. In the present embodiment, the first electrical unit 15 in the first body 10 can be a microprocessor, and the second electrical unit 24 in the second body 20 can be a battery. When the second terminal structures 22 contact the first terminal structures 12, the battery (i.e., the first electrical unit 15) can provide electricity to the microprocessor (i.e., the second electrical unit 24) through the second terminal structures 22 and the first terminal structures 12.

As shown in FIG. 1 to FIG. 6, one of the two second bodies 20 (i.e., the temple) can be assembled to one of the two opposite end portions of the first body 10 (i.e., the spectacle frame) by sequentially implementing the following steps. The second pivotal structure 21 of the second body 20 (i.e., the temple) and the first pivotal structure 13 of the first body 10 (i.e., the spectacle frame) are pivotally connected to each other, the second body 20 is rotated relative to the first body 10 through the cooperation of the first pivotal structure 13 and the second pivotal structure 21, so that the second magnetic attraction member 23 can be rotated toward the first magnetic attraction member 11 (shown in FIG. 2); and when the first magnetic attraction member 11 and the second magnetic attraction member 23 are fixed to each other, the first body 10 and the second body 20 are fixed to each other, the first terminal structures 12 contact the second terminal structures 22, the second electrical unit 24 is connected to the first electrical unit 15 through the first terminal structures 12 and the second terminal structures 22, so that the second electrical unit 24 can transmit electricity to the first electrical unit 15, or can receive signals transmitted from the first electrical unit 15.

In summary, the first terminal structures 12 and the first magnetic attraction member 11 of the wearable device D1 in the present disclosure are arranged on different axes (e.g., the first terminal structures 12 are arranged along the first direction, the Y axis shown in FIG. 2, and the first magnetic attraction member 11 is arranged along a second direction, an X axis shown in FIG. 2), so that the connection between the first terminal structures 12 and the second terminal structures 22 is established only after the first magnetic attraction member 11 is fixed to the second magnetic attraction member 23 by using the magnetic attraction therebetween, ensuring that the first terminal structures 12 and the second terminal structures 22 are in contact with each other at a right position. Moreover, since the first magnetic attraction 11 and the second magnetic attraction member 23 are provided, the first terminal structures 12 and the second terminal structures 22 can be in firm contact with each other.

It should be noted that when the wearable device D1 of the present disclosure is applied to the glasses of the present embodiment, the user can smoothly separate the temple (i.e., the second body 20) from the spectacle frame (i.e., the first body 10) by designing the first terminal structures 12 and the first magnetic attraction member 11 to be arranged on different axes, thereby effectively reducing the volume of connecting portions of the temple (i.e., the second body 20) and the spectacle. Specifically, when a user wears the glasses, the temple (i.e., the second body 20) is substantially perpendicular to the spectacle frame (i.e., the first body 10). When a user takes off the glasses and wishes to separate the temple (i.e., the second body 20) from the spectacle frame (i.e., the first body 10), the user can rotate the temple (i.e., the second body 20) toward one side away from the spectacle frame (i.e., the first body 10), and then move the temple (i.e., the second body 20) in a direction away from the spectacle frame (i.e., the first body 10), thereby conveniently and quickly detaching the temple (i.e., the second body 20) from the spectacle frame (i.e., the first body 10).

As shown in FIG. 4 and FIG. 5, in order to enhance the strength of connection between the first body 10 and the second body 20 in the wearable device D1 of the present embodiment, the first body 10 can have a first retaining structure 14, and the second body 20 can have a second retaining structure 25 that can be engaged with the first retaining structure 14, thereby helping to enhance the strength of connection between the first body 10 and the second body 20.

Specifically, the first body 10 includes a side wall that is connected to the two first functional walls 101A, 101B so as to jointly form the engaging slot 101 and a notch that is recessed in the side wall along a second direction (e.g., the X axis shown in FIG. 2) non-parallel to (e.g., perpendicular to) the first direction. The notch in the present embodiment can be defined as the first retaining structure 14. An outer side wall of the second body 20 connected to the two second functional walls 20A, 20B is defined as a top wall 20C. The second retaining structure 25 can be a protrusion arranged on the top wall 20C of the second body 20. In other embodiments of the present disclosure, the first retaining structure 14 can be a protrusion, and the second retaining structure 25 can be a notch corresponding in shape and position to the protrusion.

As shown in FIG. 2, FIG. 4, and FIG. 5, an end of the second body 20 can be inserted into the engaging slot 101 by sequentially implementing the following steps. The second body 20 is slantingly moved toward the first body 10 along the first direction so as to pivotally connect the second pivotal structure 21 and the first pivotal structure 13; and the second body 20 is rotated toward the first body 10 along the rotation axis C, so as to insert the second retaining structure 25 into the first retaining structure 14.

When the second body 20 is at a fixing position by being rotated relative to the first body 10 along the rotation axis C, the first magnetic attraction member 11 and the second magnetic attraction member 23 are fixed to each other by using the magnetic attraction there-between, so that the first body and the second body are fixed to each other, and the second retaining structure 25 is engaged with the first retaining structure 14, so that the second body 20 is incapable of being separated from the first body 10. Accordingly, the cooperation between the first magnetic attraction member 11 and the second magnetic attraction member 23 can be used to prevent the second body 20 from separating from the first body 10 along the second direction, and the cooperation between the first retaining structure 14 and the second retaining structure 25 can be used to prevent the second body 20 from separating from the first body 10 along the first direction. In other words, the cooperation between the first magnetic attraction member 11 and the second magnetic attraction member 23 and the cooperation between the first retaining structure 14 and the second retaining structure 25 can be used to effectively prevent the second body 20 from separating from the first body 10 along two different directions, so that the second body 20 is not easily separated from the first body 10 when a user wears the wearable device D1.

As shown in FIG. 5, in practical application, the second terminal structures 22 are retractable into the second body 20 to generate an elastic returning force when being pressed. When the first retaining structure 14 and the second retaining structure 25 are engaged with each other, the second terminal structures 22 are pressed to generate the elastic returning force for firmly contacting the first terminal structures 12. A direction along which each of the second terminal structures 22 is retracted into the second body 20 when being pressed can be changed according to design requirements. For example, each of the second terminal structures 22 can have a spring-like portion arranged in the second body 20, or an end of each of the second terminal structures 22 arranged in the second body 20 can be connected to an elastic sheet or a spring that provides the elastic returning force.

It should be noted that the single second body 20 and the components (i.e., the second pivotal structure 21, the second magnetic attraction member 23, the second terminal structures 22, and the second electrical unit 24) disposed thereon as shown in FIG. 1 to FIG. 6 are one of embodiments of an electrical connector 40 with magnetic attraction in the present disclosure. Moreover, the electrical connector 40 in the above embodiment shown in FIG. 1 to FIG. 6 is applied to a temple, but the electrical connector 40 can be applied to other wearable devices D1 as well.

Figure 7:
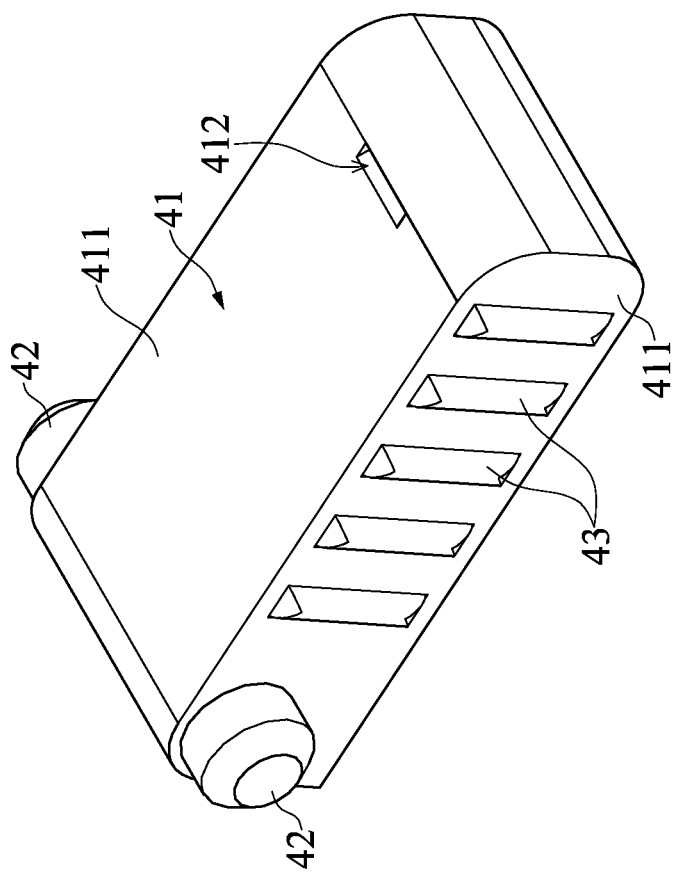
FIG. 7 is a perspective view of an electrical connector with magnetic attraction according to the present disclosure.
Figure 8:
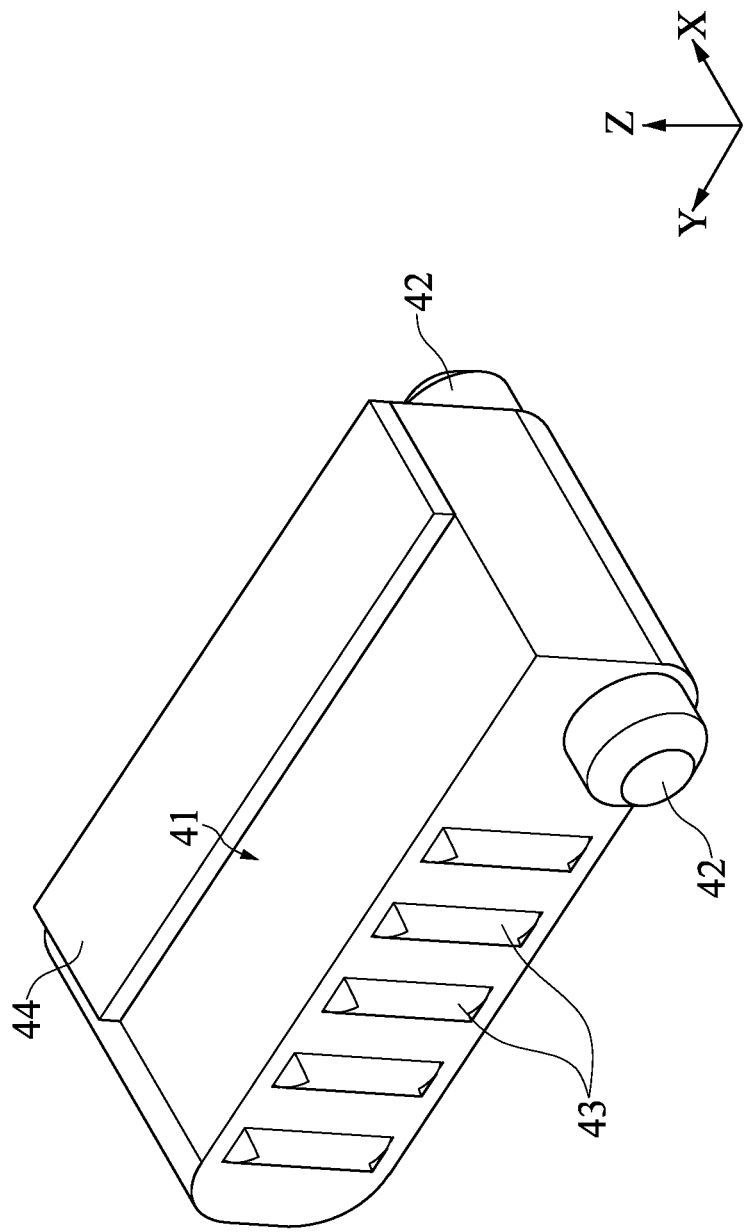
FIG. 8 is a perspective view showing the electrical connector in another angle of view.
Figure 9:
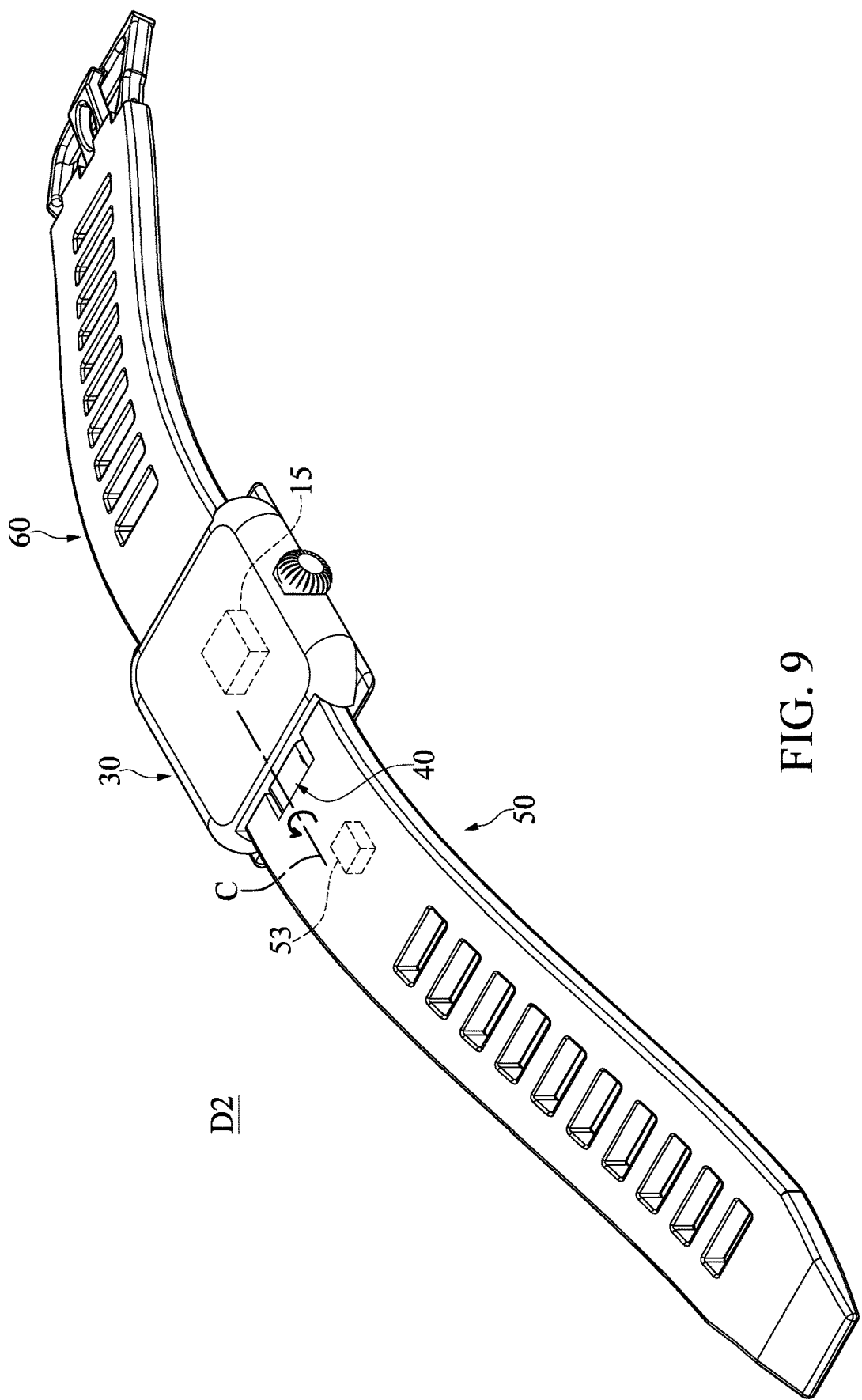
FIG. 9 is a perspective view showing the electrical connector applied to a wearable device (e.g., a watch) according to the present disclosure.
Figure 10:
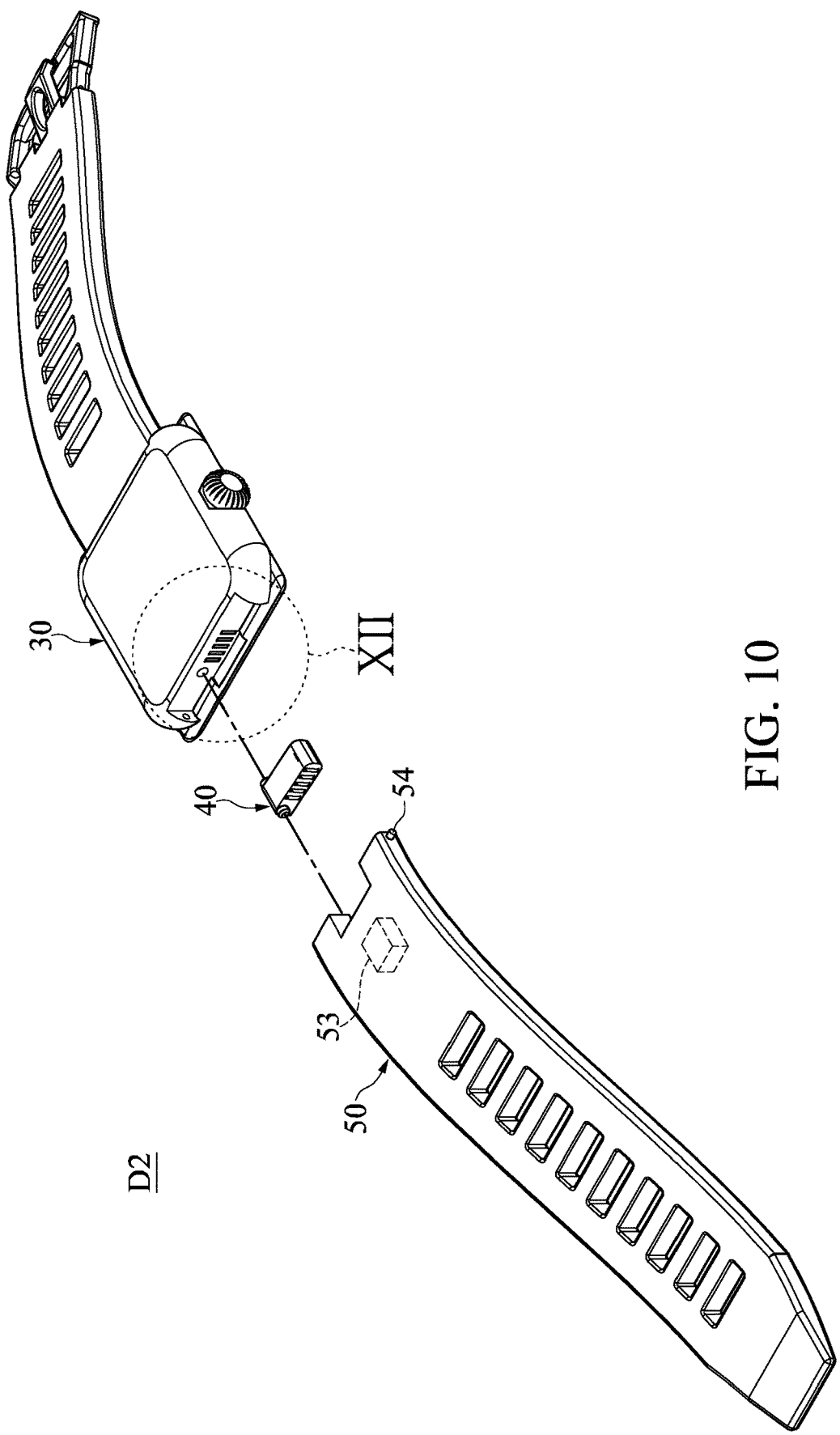
FIG. 10 and FIG. 11 are exploded views of FIG. 9 in different angles of view.

As shown in FIG. 7 to FIG. 10, FIG. 7 and FIG. 8 are perspective views of the electrical connector with magnetic attraction according to another embodiment of the present disclosure, and FIG. 9 is a perspective view showing the electrical connector applied to a wearable device (e.g., a watch) according to the present disclosure. As shown in FIG. 10, the electrical connector 40 is configured to pivotally connect between a first body 30 (e.g., a watch core) and a third body 50 (e.g., a watchband) of the wearable device D2 (e.g., a watch).

As shown in FIG. 7 and FIG. 8, the electrical connector 40 includes a second body 41. The second body 41 has two outer walls connected to each other and defined as two second functional walls 411. One of the two second functional walls 411 is provided with a second pivotal structure 42 protruding therefrom, and the other one of the two functional walls 411 is provided with a second magnetic attraction member 44. A side wall of the second body 41 opposite to the above second pivotal structure 42 is provided with another second pivotal structure 42 protruding therefrom. The second body 41 is provided with a plurality of second terminal structures 43 therein, and two opposite portions of the second terminal structures 43 are respectively exposed from the corresponding second functional wall 411 and the side wall of the second body 41. The drawings only show one embodiment, but the number and size of the second terminal structures 43 or the second magnetic attraction member 44 can be changed according to design requirements. Each of the second pivotal structures 42 in the present embodiment is a circular column, but the present disclosure is not limited thereto. In other embodiments of the present disclosure, the second pivotal structure 42 can be a hole or a slot.

It should be noted that the electrical connector 40 of the present embodiment is configured to connect the first body 30 and the third body 50. Accordingly, the second body 41 is provided with the two second pivotal structures 42 that are configured to be pivotally connected to the first pivotal structure 31 of the first body 30 and the third pivotal structure 51 of the third body 50 (shown in FIG. 11), respectively. However, if the second body 41 is applied to another wearable device D2, the second body 41 can be formed with a single second pivotal structure 42. Moreover, two opposite outer walls of the second body 41 in the present embodiment are formed to respectively expose two opposite portions of the second terminal structures 43, but in other embodiments of the present disclosure, the second body 41 can be formed to expose the second terminal structures 43 only through a single outer wall thereof.

In the present embodiment, the interior of the second body 41 can be provided to receive the second terminal structures 43 and the relevant and necessary electrical components, but the present disclosure is not limited thereto. In other embodiments of the present disclosure, the second body 41 can be provided with microprocessors and memory chips therein according to design requirements.

FIG. 9 to FIG. 14 are respective views showing the wearable device D2 of the present disclosure applied to a watch, and show the electrical connector 40 of the present disclosure applied to the wearable device. The first body 30 is a watch core, the third body 50 is a watchband, and the first body 30 is connected to another watchband 60. The first body 30 (i.e., the watch core) in the present embodiment is connected to the third body 50 (i.e., the watchband) and a conventional watchband, but the present disclosure is not limited thereto. In other embodiments of the present disclosure, the first body 30 (i.e., the watch core) can be connected to two third bodies 50 (i.e., the two watchbands), and the first body 30 (i.e., the watch core) is connected to each of the two third bodies 50 through one electrical connector 40.

The first body 30 includes a plurality of components associated with the displaying of time, and an engaging slot 301. Two inner walls of the engaging slot 301 of the first body 10 connected to each other are defined as two first functional walls 301A, 301B. The first functional wall 301A is provided with a first pivotal structure 31 and a plurality of first terminal structures 32 disposed thereon. The first functional wall 301B is provided with a first magnetic attraction member 33 disposed thereon. The structure and connection relationship of the first pivotal structure 31, the first terminal structures 32, the first magnetic attraction member 33, the second pivotal structure 42, the second terminal structures 43, and the second magnetic attraction member 44 are substantially identical to that of the first pivotal structure 13, the first terminal structures 12, the first magnetic attraction member 11, the second pivotal structure 21, the second terminal structures 22, and the second magnetic attraction member 23e, so that descriptions of the same components in the following description will be omitted for the sake of brevity.

Furthermore, other inner walls of the engaging slot 301 can be formed with a structure (e.g., a shaft hole 32 shown in FIG. 12) that is used to connect a conventional watchband. The drawings only show an embodiment, and the size and shape of the engaging slot 31 can be changed according to design requirements.

Figure 11:
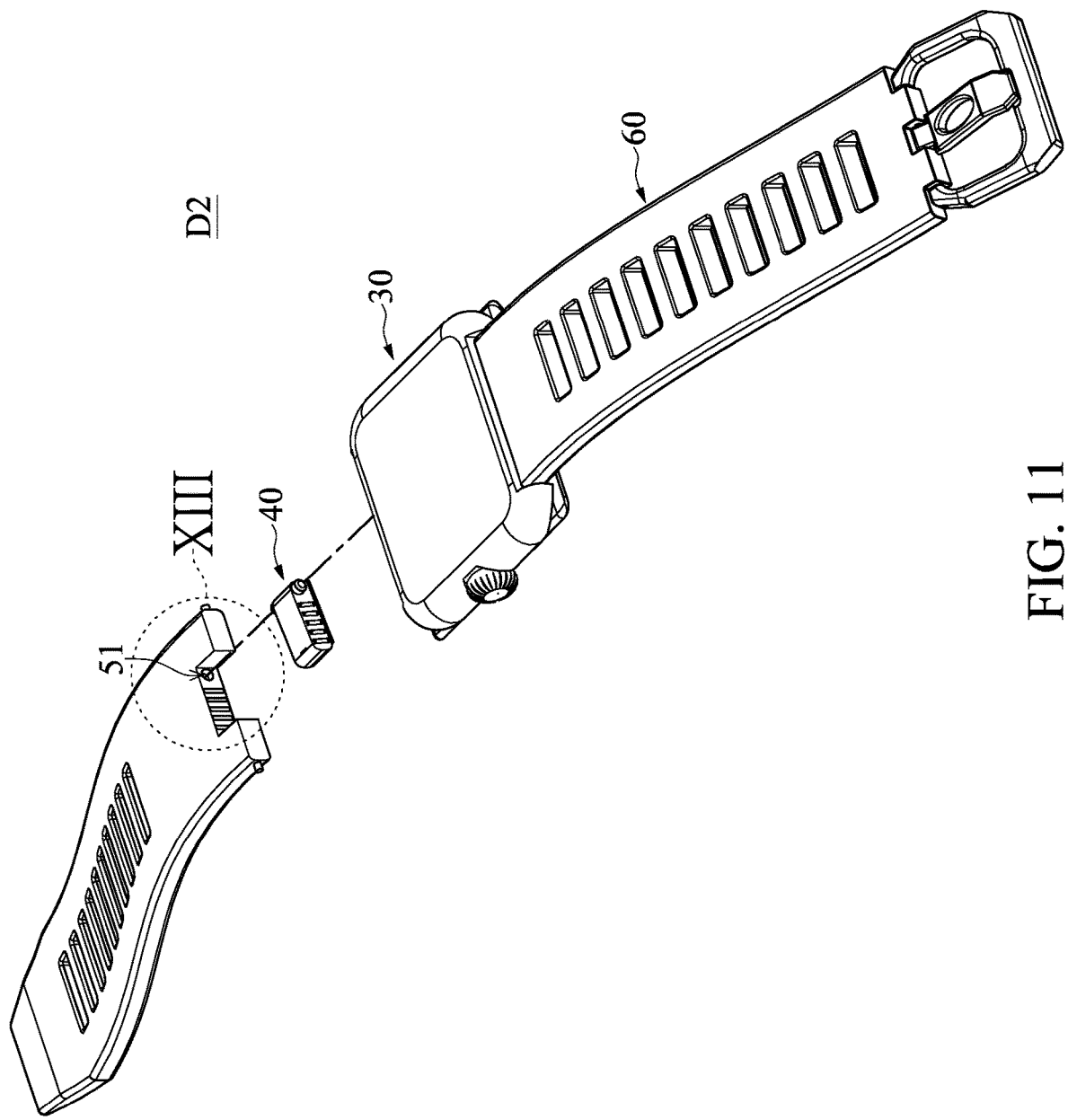
Figure 12:
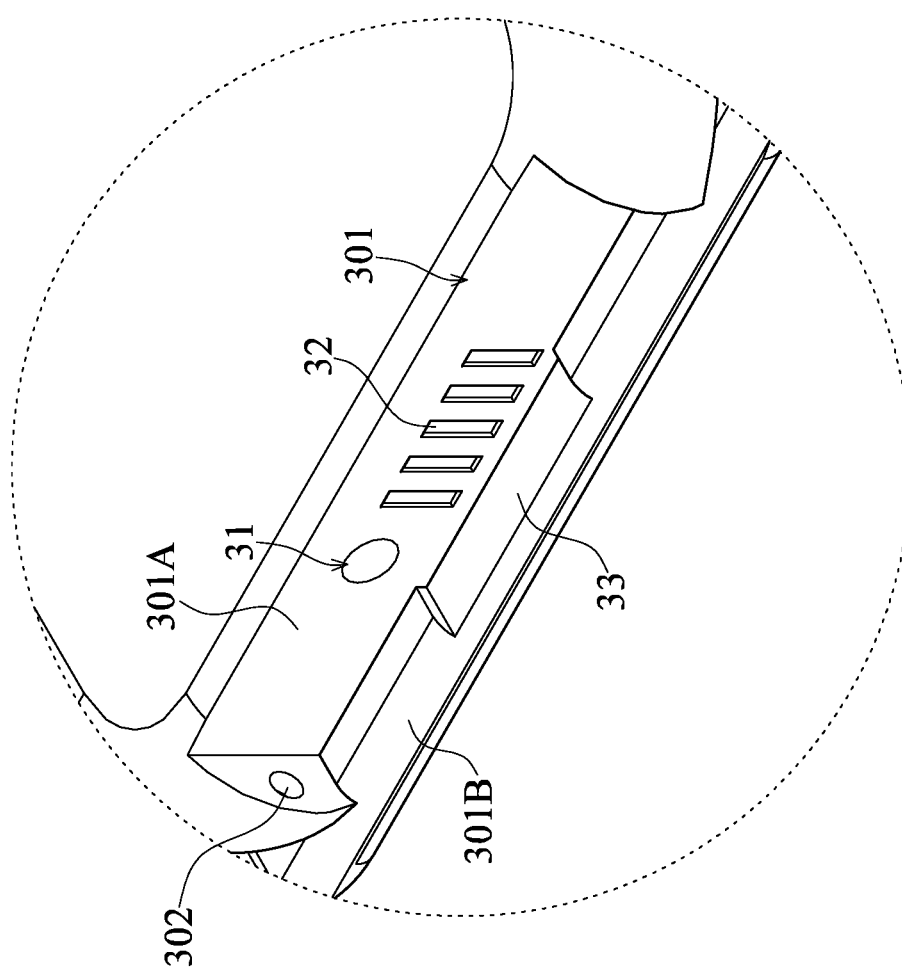
FIG. 12 is an enlarged view of portion XII of FIG. 10.
Figure 13:
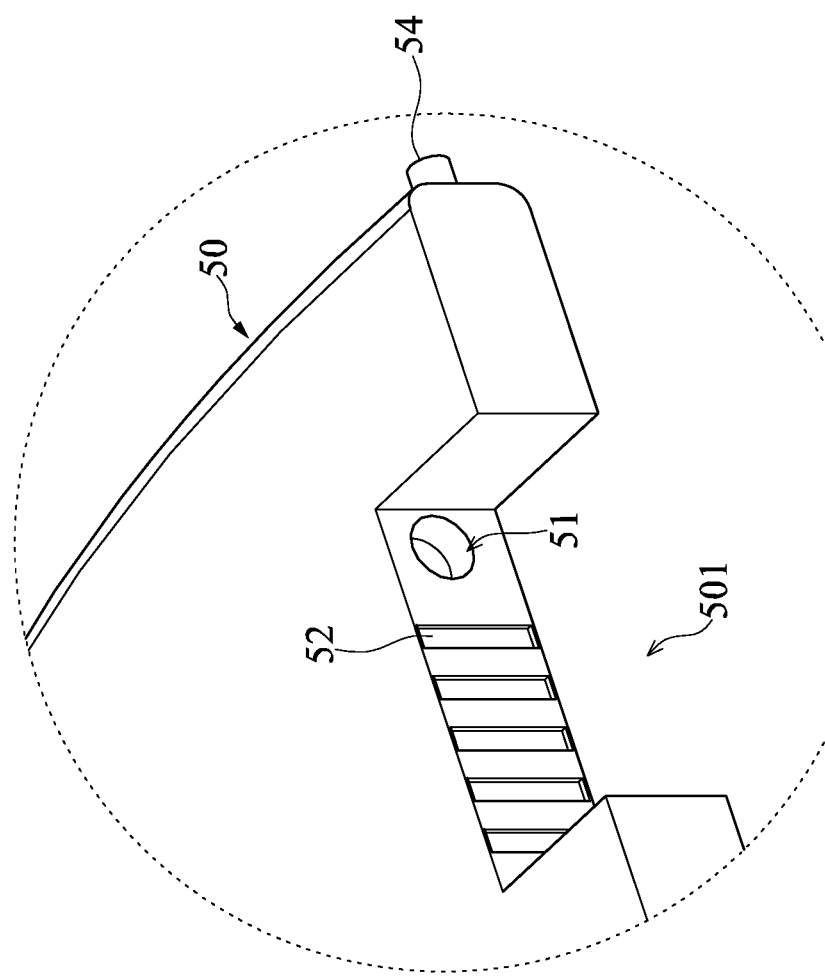
FIG. 13 is an enlarged view of portion XIII of FIG. 11.

As shown in FIG. 11 and FIG. 13, the third body 50 has an engaging slot 501 corresponding in position to the electrical connector 40. A side wall of the engaging slot 501 is provided with a third pivotal structure 51 and a plurality of third terminal structures 52. The third pivotal structure 51 is configured to be pivotally connected to one of the second pivotal structures 42 of the electrical connector 40. The third terminal structures 52 are used to contact the second terminal structures 43. In the present embodiment, the first pivotal structure 31 (shown in FIG. 12) and the third pivotal structure 51 are shaft holes, and the two second pivotal structures 42 of the second body 41 (shown in FIG. 7) are columns, but the present disclosure is not limited thereto. In other embodiments of the present disclosure, the first pivotal structure 31 and the third pivotal structure 51 can be columns, and the two second pivotal structures 42 of the second body 41 can be shaft holes.

As shown in FIG. 9 and FIG. 10, the third body 50 is provided with a third electrical unit 53 therein. The third electrical unit 53 can be a battery, a memory chip, or a microprocessor, but is not limited thereto. The third body 50 is further provided with a structure (e.g., two shafts 54 respectively protruding from two opposite ends of the third body 50) that is used to be pivotally connected to the first body 30. In the present embodiment, the third body 50 and the first body 30 are pivotally connected to each other through the shaft 54 and the shaft hole 302, but the present disclosure is not limited thereto. According to design requirements, the third body 50 and the first body 30 can be pivotally connected to each other through other mechanisms. In other embodiments of the present disclosure, the third body 50 can be provided with a quick-release assembly.

As shown in FIG. 9 to FIG. 14, when the two second pivotal structures 42 of the electrical connector 40 are pivotally connected to the first pivotal structure 31 of the first body 30 and the third pivotal structure 51 of the third body 50 (i.e., the watchband), respectively, the electrical connector 40 is rotatable relative to the first body 30 and the third body 50 along a rotation axis C. As shown in FIG. 9, when the second magnetic attraction member 44 of the electrical connector 40 (shown in FIG. 8) is fixed to the first magnetic attraction member 33 of the first body 30 by using a magnetic attraction there-between, the second terminal structures 43 of the electrical connector 40 are connected to the first terminal structures 32 and the third terminal structures 52, and the first electrical unit 15 in the first body 30 is connected to the third electrical unit 53 through the first terminal structures 32, the second terminal structures 43, and the third terminal structures 52.

In practical application, if the third electrical unit 53 is a battery and the first electrical unit 15 in the first body 30 is a microprocessor, the third electrical unit 53 can provide electricity to the first electrical unit 15 through the first terminal structures 32, the second terminal structures 43, and the third terminal structures 52.

Figure 14:
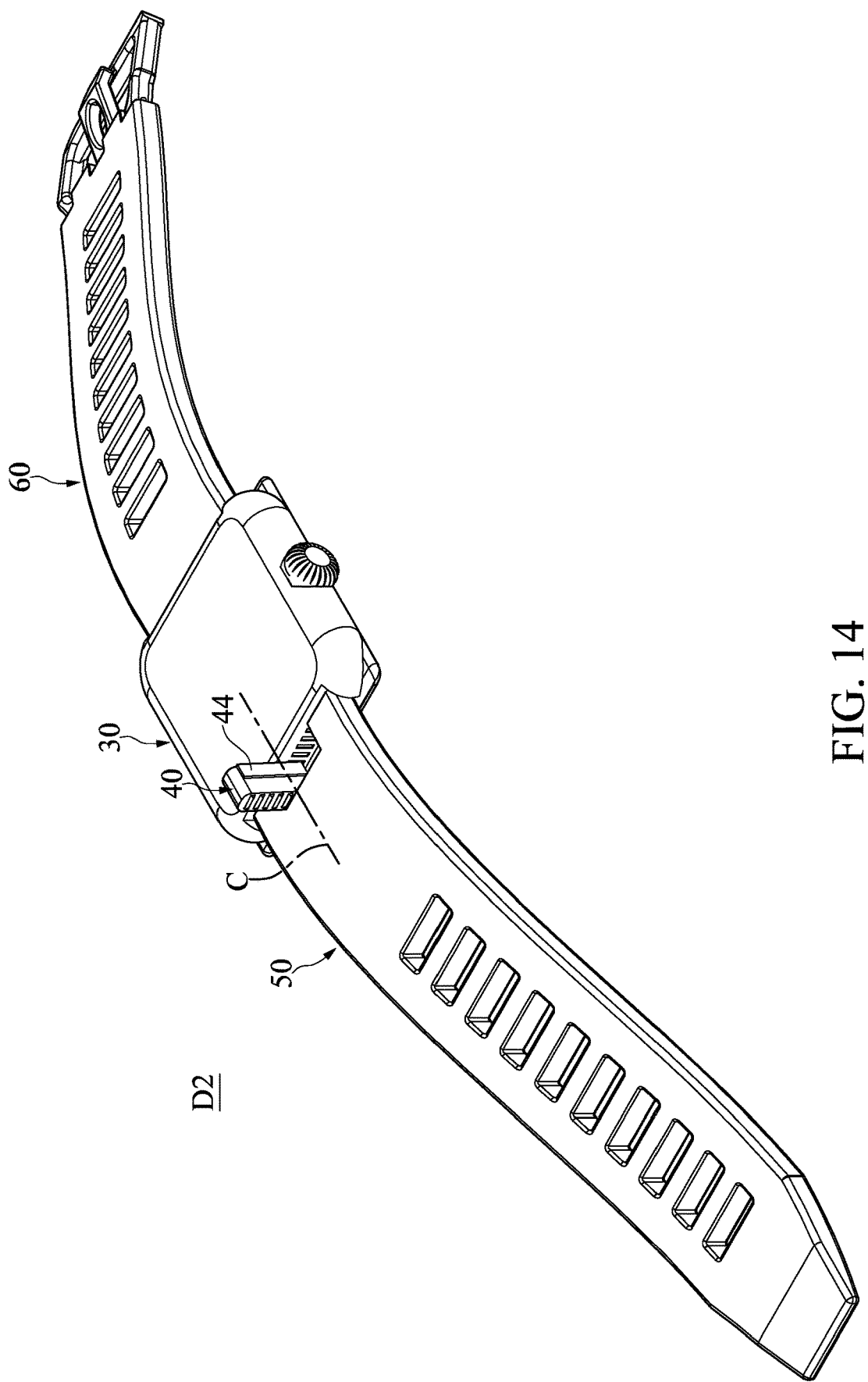
FIG. 14 is a perspective view showing an assembling process of the electrical connector of FIG. 9.

As shown in FIG. 7 and FIG. 14, an outer wall of the second body 41 in the practical application opposite to the second magnetic attraction member 44 can be formed with an assisting structure 412. The assisting structure 412 is configured for a user to easily rotate the second body 41 relative to the first body 30.

In conclusion, the electrical connector of the present disclosure can be quickly and conveniently detached or assembled to the wearable device, and the electrical connector and the wearable device of the present disclosure can each be provided with at least one electrical unit therein.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A wearable device, comprising:
   a first body including an engaging slot, wherein two inner walls of the engaging slot of the first body connected to each other are defined as two first functional walls;
   at least one first magnetic attraction member fixed on one of the two first functional walls;
   a plurality of first terminal structures disposed in another one of the two first functional walls and spaced apart from each other;
   a first pivotal structure arranged on the first body and arranged adjacent to the engaging slot;
   a first electrical unit connected to at least one of the first terminal structures;
   a second body having a second pivotal structure that is configured to be pivotally connected to the first pivotal structure, wherein two outer walls of the second body connected to each other are defined as two second functional walls;
   at least one second magnetic attraction member disposed on one of the two second functional walls;
   a plurality of second terminal structures disposed in another one of the two second functional walls and spaced apart from each other; and
   a second electrical unit connected to at least one of the second terminal structures,
   wherein when the first pivotal structure and the second pivotal structure are pivotally connected to each other, the second body is rotatable relative to the first body along a rotation axis, and wherein when the second body is at a fixing position by being rotated relative to the first body, the first magnetic attraction member and the second magnetic attraction member are fixed to each other by a magnetic attraction there-between, so that the first body and the second body are fixed to each other, and the first terminal structures respectively contact the second terminal structures, and the first electrical unit connects with the second electrical unit.

2. The wearable device according to claim 1, wherein the first body further includes a first retaining structure, and the second body further includes a second retaining structure, wherein the second pivotal structure is pivotally connected to the first pivotal structure along a first direction, and wherein when the first magnetic attraction member and the second magnetic attraction member are fixed to each other by using the magnetic attraction there-between, the first retaining structure and the second retaining structure are engaged with each other, and the second body is incapable of being separated from the first body along the first direction.

3. The wearable device according to claim 2, wherein the second terminal structures are retractable into the second body to generate an elastic returning force when being pressed, and wherein when the first retaining structure and the second retaining structure are engaged with each other, the second terminal structures are pressed to generate the elastic returning force.

4. The wearable device according to claim 2, wherein the engaging slot is recessed in the first body along the first direction, the first body includes a side wall that is connected to the two first functional walls so as to jointly form the engaging slot and a notch that is recessed in the side wall along a second direction non-parallel to the first direction, and the notch is defined as the first retaining structure, wherein the second retaining structure is a protrusion arranged on a top wall of the second body connected to the two second functional walls, and wherein when the second body is rotated to the first body along the rotation axis, and the second retaining structure is inserted into the first retaining structure.

5. The wearable device according to claim 1, wherein the first electrical unit is a microprocessor, and the second electrical unit is a battery, and wherein when the first magnetic attraction member and the second magnetic attraction member are fixed to each other by using the magnetic attraction there-between, and the first terminal structures and the second terminal structures are in contact with each other, the battery is configured to supply electricity to the microprocessor through the first terminal structures and the second terminal structures.

6. The wearable device according to claim 1, wherein the wearable device is a pair of glasses, the first body is a spectacle frame, and at least one temple of the glasses is the second body.

7. An electrical connector with magnetic attraction for being applied to a wearable device that includes a first body, at least one first magnetic attraction member and a plurality of first terminal structures which are respectively disposed on two inner walls of the first body connected to each other, a first pivotal structure disposed on the first body, and a first electrical unit connected to at least one of the first terminals structures, the electrical connector comprising:
   a second body having a second pivotal structure that is configured to be pivotally connected to the first pivotal structure, wherein two outer walls of the second body connected to each other are defined as two second functional walls;
   at least one second magnetic attraction member disposed on one of the two second functional walls, wherein the at least one second magnetic attraction member is configured to fix to the at least one first magnetic attraction member by using a magnetic attraction there-between;
   a plurality of second terminal structures disposed in another one of the two second functional walls and spaced apart from each other, wherein the second terminal structures are configured to contact the first terminal structures,
   wherein when the second pivotal structure is pivotally connected to the first pivotal structure, the second body is rotatable relative to the first body along a rotation axis, and wherein when the second body is at a fixing position by being rotated relative to the first body, the second magnetic attraction member is fixed to the first magnetic attraction member by using the magnetic attraction there-between, so that the second body is fixed to the first body, and
   wherein when the second magnetic attraction member is fixed to the first magnetic attraction member by using the magnetic attraction there-between, the second terminal structures respectively contact the first terminal structures.

8. The electrical connector according to claim 7, wherein the second terminal structures are retractable into the second body to generate an elastic returning force when being pressed.

9. The electrical connector according to claim 7, wherein two opposite portions of the second terminal structures are respectively exposed from the corresponding second functional wall and a side wall of the second body that is opposite to the corresponding second functional wall, the number of the second pivotal structure of the second body is two, and the two second pivotal structures are respectively formed on the side wall and the second functional wall exposing the second terminal structures.

10. The electrical connector according to claim 9, wherein the wearable device further includes a third body, the third body having a plurality of third terminal structures and including a third pivotal structure and a third electrical unit disposed in the third body, and wherein when the second magnetic attraction member is fixed to the first magnetic attraction member by using the magnetic attraction therebetween, the two opposite portions of the second terminal structures exposed from the second body are configured to respectively contact the first terminal structures and the third terminal structures, and the third electrical unit is connected to the first electrical unit through the first terminal structures, the second terminal structures, and the third terminal structures.

* * * * *